(12) United States Patent
Butschan

(10) Patent No.: US 12,515,289 B2
(45) Date of Patent: Jan. 6, 2026

(54) MILLING TOOL FOR A DENTAL MILLING MACHINE AND ARRANGEMENT OF A MILLING SPINDLE AND A MILLING TOOL

(71) Applicant: vhf camfacture Aktiengesellschaft, Ammerbuch (DE)

(72) Inventor: Jens Butschan, Ostfildern (DE)

(73) Assignee: vhf camfacture Aktiengesellschaft, Ammerbuch (DE)

( * ) Notice: Subject to any disclaimer, the term of this patent is extended or adjusted under 35 U.S.C. 154(b) by 486 days.

(21) Appl. No.: 18/069,319

(22) Filed: Dec. 21, 2022

(65) Prior Publication Data
US 2023/0201985 A1 Jun. 29, 2023

(30) Foreign Application Priority Data
Dec. 23, 2021 (EP) .................................. 21217579

(51) Int. Cl.
*B23Q 11/00* (2006.01)
*A61C 13/00* (2006.01)
*A61C 13/38* (2006.01)
*B23C 5/10* (2006.01)

(52) U.S. Cl.
CPC ........ *B23Q 11/005* (2013.01); *A61C 13/0003* (2013.01); *B23C 5/10* (2013.01); *B23C 2230/04* (2013.01); *Y10S 29/083* (2013.01); *Y10T 409/304088* (2015.01)

(58) Field of Classification Search
CPC ... B23Q 11/005; B23Q 11/006; Y10S 29/083; Y10T 409/304088

USPC .................................... 29/DIG. 83; 409/137
See application file for complete search history.

(56) References Cited

U.S. PATENT DOCUMENTS

| 5,772,367 A | 6/1998 | Daniel | |
|---|---|---|---|
| 2012/0121354 A1* | 5/2012 | Dickey | B23Q 11/0046 409/137 |
| 2014/0020919 A1* | 1/2014 | Dvorak | B23Q 11/005 173/75 |
| 2016/0107282 A1* | 4/2016 | Chen | B23Q 11/005 416/234 |
| 2017/0341115 A1* | 11/2017 | Noll | B23Q 11/005 |
| 2021/0260710 A1 | 8/2021 | Fitzpatrick | |

(Continued)

FOREIGN PATENT DOCUMENTS

| DE | 10248526 A1 * | 4/2000 |
| DE | 102019000920 A1 | 8/2019 |
| EP | 1872901 A1 | 1/2008 |

(Continued)

*Primary Examiner* — Erica E Cadugan
(74) *Attorney, Agent, or Firm* — Smartpat PLC

(57) ABSTRACT

A milling tool for a dental milling machine comprises a base body (11) with a rotation axis (12). A shank (15) for clamping the milling tool (10) is provided at a first end (13) of the base body (11). A cutting edge (16) is arranged at a second end (14) of the base body (11). A receiving section (17) is provided on the base body (11) between the shank (15) and the cutting edge (16). A blower wheel (20) is arranged on the receiving section (17) of the base body (11). The blower wheel (20) is formed such that, when the milling tool (10) is driven in a direction of rotation (19) provided for chip removal, an air flow (25) is generated by the blower wheel (20) in the direction from the blower wheel (20) toward the cutting edge (16) of the milling tool (10).

15 Claims, 6 Drawing Sheets

(56) References Cited

U.S. PATENT DOCUMENTS

2022/0040808 A1* 2/2022 Chen .................... B23Q 11/005

FOREIGN PATENT DOCUMENTS

FR          2909018 B1    7/2009
WO    WO-2016/108800 A1 *  7/2016

* cited by examiner

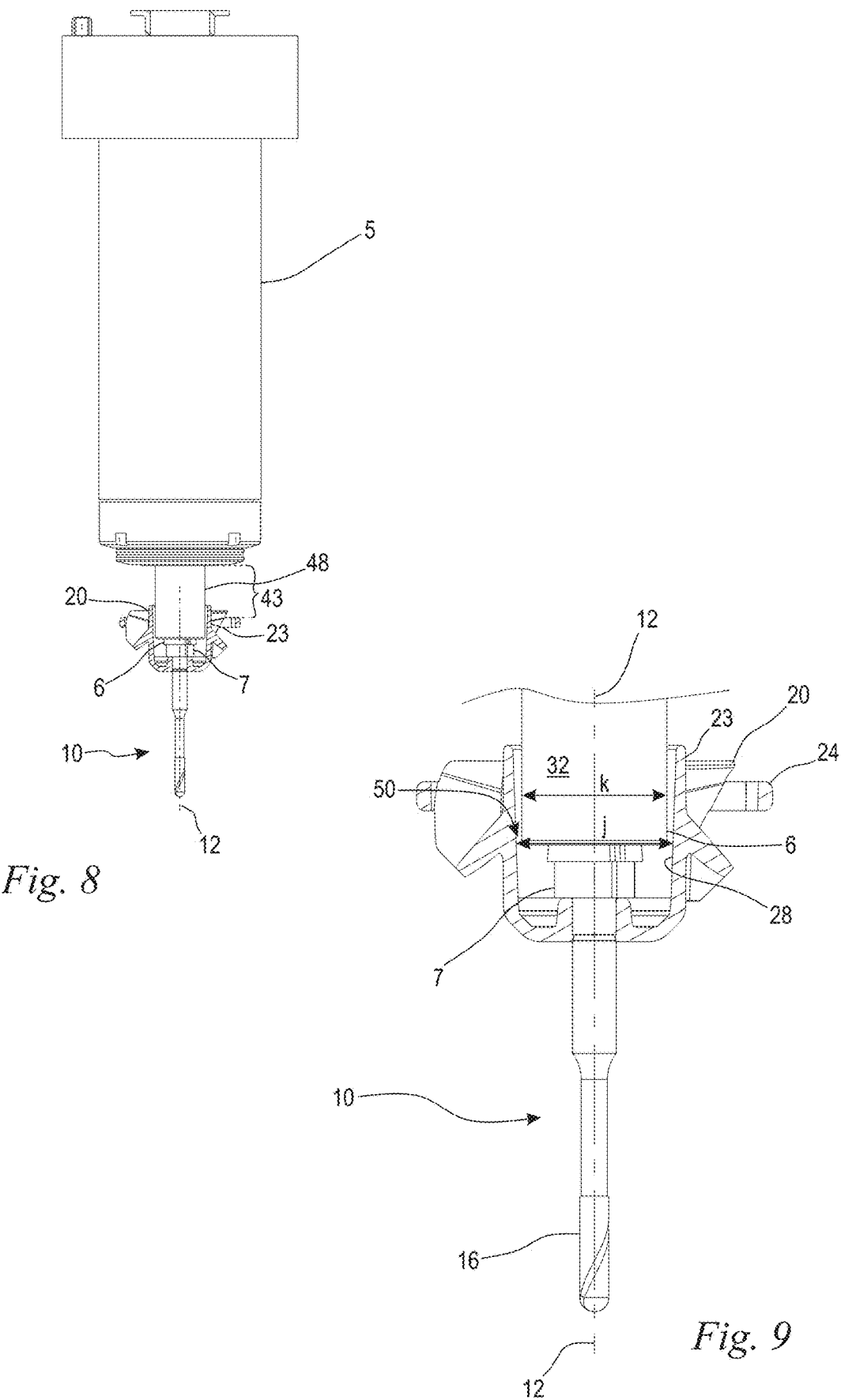

MILLING TOOL FOR A DENTAL MILLING MACHINE AND ARRANGEMENT OF A MILLING SPINDLE AND A MILLING TOOL

CROSS-REFERENCE TO RELATED APPLICATION

This application claims the benefit of European Patent Application No. 21217579.8, filed 2021 Dec. 23, the contents of which is hereby incorporated by reference in its entirety.

TECHNICAL FIELD

The disclosure relates to a milling tool for a dental milling machine and to an assembly comprising a milling spindle and a milling tool.

BACKGROUND

For the production of dental prostheses, e.g., crowns, bridges, etc., blanks made of various materials are machined in dental milling machines. The manufacturing process includes multiple machining operations, e.g., milling, grinding, polishing, etc. Chips, cutting dust, or polishing dust are produced during machining and are deposited on the workpiece and in the machine tool. If the workpiece clogs with chips or the processing dust, this can lead to damage to the milling tool and the workpiece. To prevent damage such as tool breakage, the workpiece is cleaned with compressed air during machining. Corresponding air compressors are used as the source of compressed air, either provided in the processing machine or as an external standalone solution. Such compressed air systems are high maintenance and expensive. If the air compressors are integrated in the processing machine, they take up installation space. If standalone solutions are used, floor space is required.

SUMMARY

The disclosure is based on the task of simplifying a dental milling machine.

The task concerning the simplifying of a dental milling machine is solved with a milling tool for a dental milling machine as claimed. Furthermore, the same task is also solved by an assembly comprising a milling spindle and such a milling tool.

The milling tool for a dental milling machine comprises a base body with a rotation axis. The base body extends along its rotation axis from a first end to a second end. A shank for clamping the milling tool is provided at the first end of the base body. A cutting edge is arranged at the second end of the base body. A receiving section is provided on the base body between the shank and the cutting edge. A blower wheel is arranged on the receiving section of the base body. The blower wheel is designed in such a way that when the milling tool is driven in a direction of rotation intended for chip removal, an air flow is generated by the blower wheel in the direction from the blower wheel to the cutting edge of the milling tool.

During operation of the milling tool, the milling tool is held in a tool holder of the milling spindle. The milling tool is driven in a direction of rotation in which the cutting edge of the milling tool cuts the workpiece. In the process, the blower wheel generates an air flow that is directed at the workpiece. The chips and/or dust on the workpiece are blown from the workpiece by the air flow. Damage to the milling tool and the workpiece can thus be avoided.

The airflow induced by the blower wheel effectively clears the workpiece of chips and/or dust, eliminating the need for a conventional compressed air connection. Accordingly, the corresponding source of compressed air can also be dispensed with. The above-mentioned disadvantages associated with a conventional compressed air system can be avoided.

The blower wheel preferably has multiple blades. In the circumferential direction of the rotation axis adjacent blades are arranged at a uniform angular distance around the rotation axis of the base body. That is, the blades are circumferentially evenly spaced. Thus, sufficient compressed air can be provided. In a particularly advantageous embodiment, the blower wheel includes six blades.

The blower wheel has a hub, wherein the blower wheel is preferably fixed to the receiving section of the base body by means of its hub. In particular, the blower wheel has a pot-shaped retaining body adjoining the hub. The blades of the blower wheel are preferably attached to a circumferential wall of the retaining body. The pot-shaped retaining body preferably extends coaxially to the rotation axis in the direction from the receiving section toward the first end of the base body of the milling tool. In particular, the pot-shaped retaining body projects at least partially beyond the shank of the milling tool. Preferably, the pot-shaped retaining body is designed in such a way that when the milling tool is clamped to its shank in a tool holder, the spindle nose projects into the pot-shaped section without contacting the pot-shaped retaining body. In the clamped condition of the milling tool, first the shank of the milling tool, then the spindle nose, and finally the retaining body of the blower wheel are arranged running radially outward in the direction from the rotation axis. This design of the pot-shaped retaining body allows the milling tool to be clamped to a section of the shank that is located inside the pot-shaped retaining body. Thus, a short and compact design of the milling tool can be realized. This in turn has the advantage that the milling tool has a high level of resistance, particularly to bending forces, while allowing high swivel angles to be realized during the milling process at the same time.

Preferably, a stop facing the shank is provided on the hub. The stop is used to limit the clamping depth when clamping the milling tool in a tool holder of a milling spindle. This ensures that the milling tool is held in the tool holder over a constant clamping depth with each clamping process.

It is preferably provided that the blower wheel has an antechamber, which is bounded by the hub, by a bottom of the retaining body, and by the circumferential wall of the retaining body. When the milling tool is clamped, the spindle moves with its tool holder in the direction of the milling tool until the tool holder contacts the stop of the hub. The tool holder and the milling tool are aligned approximately coaxially to each other. In order to ensure that the tool is properly clamped, the hub stop must not be contaminated, e.g., by chips and the like. Such contamination would get stuck between the stop of the milling tool and the tool holder. Such contamination could result in an insufficient clamping depth or even a skewed position of the milling tool in relation to the tool holder. The milling tool and the milling spindle would no longer be coaxially aligned with each other, which could damage the milling tool and the workpiece.

In order to avoid the above-mentioned disadvantages, the blower wheel preferably has an antechamber, which serves as a reservoir for chips or other contamination. If particles get into the blower wheel during operation of the milling tool, they fall into the antechamber without remaining on the hub stop. This ensures that the hub stop remains free of contamination, which enables proper clamping of the milling tool.

The antechamber is preferably subdivided by several ribs running radially to the rotation axis to stiffen the retaining body. On the one hand, the ribs ensure sufficient stiffness of the retaining body, and on the other hand, the antechamber still provides sufficient volume to accommodate corresponding contamination of the blower wheel. In a particularly preferred embodiment of the milling tool, the pot-shaped retaining body has at least one passage opening for draining liquids from the antechamber. Particularly advantageously, a passage opening is provided for each subdivision of the antechamber. The at least one passage opening is preferably formed at the bottom of the retaining body, whereby liquids can flow out of the antechamber through the passage opening into the environment.

Preferably, the circumferential wall of the retaining body is designed to at least partially encompass the circumference of a milling spindle when the milling tool is clamped in place. In particular, the spindle nose of the milling spindle is shielded by the circumferential wall of the retaining body. This protects the mechanics of the tool holder and/or the spindle bearing from chips and dust.

It is preferably provided that the blower wheel has an outer ring, wherein the outer ring encompasses the blades of the blower wheel. The outer ring is attached to the blades, preferably at their radially outer ends. The outer ring connects the blades together, making the blades mutually stiffened. In other words, the blades are connected to each other by the outer ring at their outer ends extending radially to the rotation axis so that the blades support each other via the outer ring. Due to the increased stiffness, the blades are dimensionally stable even at high speeds of the milling tool.

Another advantage of the outer ring is that the air flow is at least partially prevented from flowing radially outwards to the rotation axis. In addition, the outer ring favors the formation of a high-pressure potential between the bottom and top of the blades. When the milling tool is rotated, the bottom of a blade is subjected to significantly higher pressure than the top of the same blade. At the radially outer end of the blade, the air tends to flow from the bottom of the blade to the top of the blade to equalize pressure. In contrast, the outer ring prevents overflow from the bottom to the top, thus maintaining a high-pressure potential. Thus, the outflow velocity in the direction of the cutting edge of the tool is increased.

In particular, it is provided that the blower wheel has a first end face facing away from the cutting edge of the base body, while the distance between the blades and the first end face of the blower wheel measured in the direction of the rotation axis is smaller than the distance between the outer ring and the first end face of the blower wheel measured in the direction of the rotation axis. This ensures an air gap between the outer ring and the milling spindle when the milling tool is in operation. This allows the blower wheel to suck in air from radially outside via the air gap and expel it in the axial direction.

The blower wheel has a conical outer contour in a view radial to the rotation axis of the base body. Particularly when swiveling the milling tool, it is to be ensured that the milling tool does not collide with the workpiece or with parts of the dental milling machine. The conical design of the outer contour increases the freedom of movement of the milling tool, which reduces the collision potential.

Preferably, the blade extends along a profile center line from a leading edge to a trailing edge. In the direction of view perpendicular to a profile of the blade, a first tangent at the profile center line in the leading edge of the blade encloses an angle with the rotation axis of the base body, the angle preferably being within a range of 90° to 130°, particularly in a range of 100° to 120°. In the direction of view perpendicular to a profile of the blade, a second tangent at the profile center line in the trailing edge of the blade encloses an angle with the rotation axis of the base body, the angle preferably being within a range of 0° to 20°, particularly in a range of 5° to 15°. This design of the blade deflects the airflow across the air gap between the outer ring and the spindle nose in a direction from the blower wheel to the cutting edge of the milling tool. The air flow can be used to keep the machining area on the workpiece free of dust and chips in a targeted manner.

Further features of the invention are apparent from the description and the drawing, in which an example of an embodiment of the invention, described in detail below, is illustrated.

BRIEF DESCRIPTION OF THE DRAWINGS

FIG. 8 is a side view showing the milling spindle with the cut milling tool.

FIG. 9 is an enlarged view of the cut milling tool according to FIG. 8.

DETAILED DESCRIPTION

Figure 1:
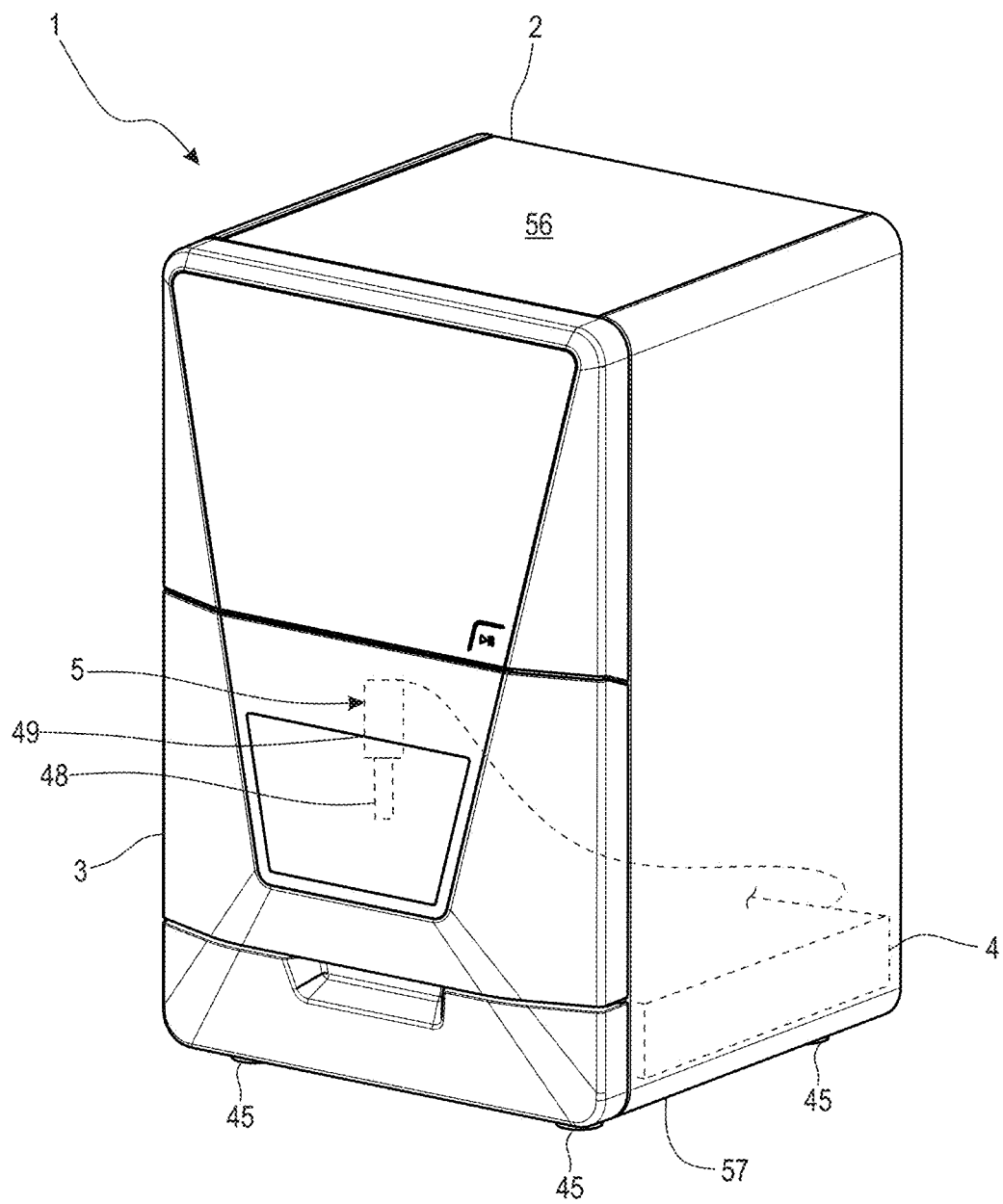
FIG. 1 is a schematic view showing a dental milling machine.

FIG. 1 illustrates a dental milling machine 1. The dental milling machine 1 is intended for the production of dental prostheses, in particular for the production of crowns and bridges. The dental milling machine 1 has a housing 2 with a loading flap 3. The housing 2 delimits an interior space of the dental milling machine 1. After the loading flap 3 opens, access to the interior of the dental milling machine 1 is open so that, for example, a blank can be inserted or removed. The housing 2 of the milling machine has a top side 56 and a bottom side 57. On the bottom side 57 of the dental milling machine, several feet 45 are arranged, and the dental milling machine 1 is placed on its feet 45. The term "top" indicates a direction running from the bottom side 57 to the top side 56 of the dental milling machine 1. The term "bottom" refers to a direction extending from the top side 56 to the bottom side 57 of the dental milling machine 1.

As illustrated schematically in FIG. 1, a milling spindle 5 is arranged in the dental milling machine 1. The milling spindle 5 comprises an electric motor 49 and a spindle 48 driven by the electric motor. In the preferred embodiment, the milling spindle 5 can be adjusted in space translationally, and preferably also rotationally, by means of a drive system that is not described in greater detail. Furthermore, the dental milling machine 1 has a control device 4 shown only schematically in FIG. 1. The control device 4 is used to supply electricity and control the milling spindle 5 and the drive system. The milling spindle 5 and the drive system are connected to the control device 4, in particular via an electrical connection.

Figure 2:
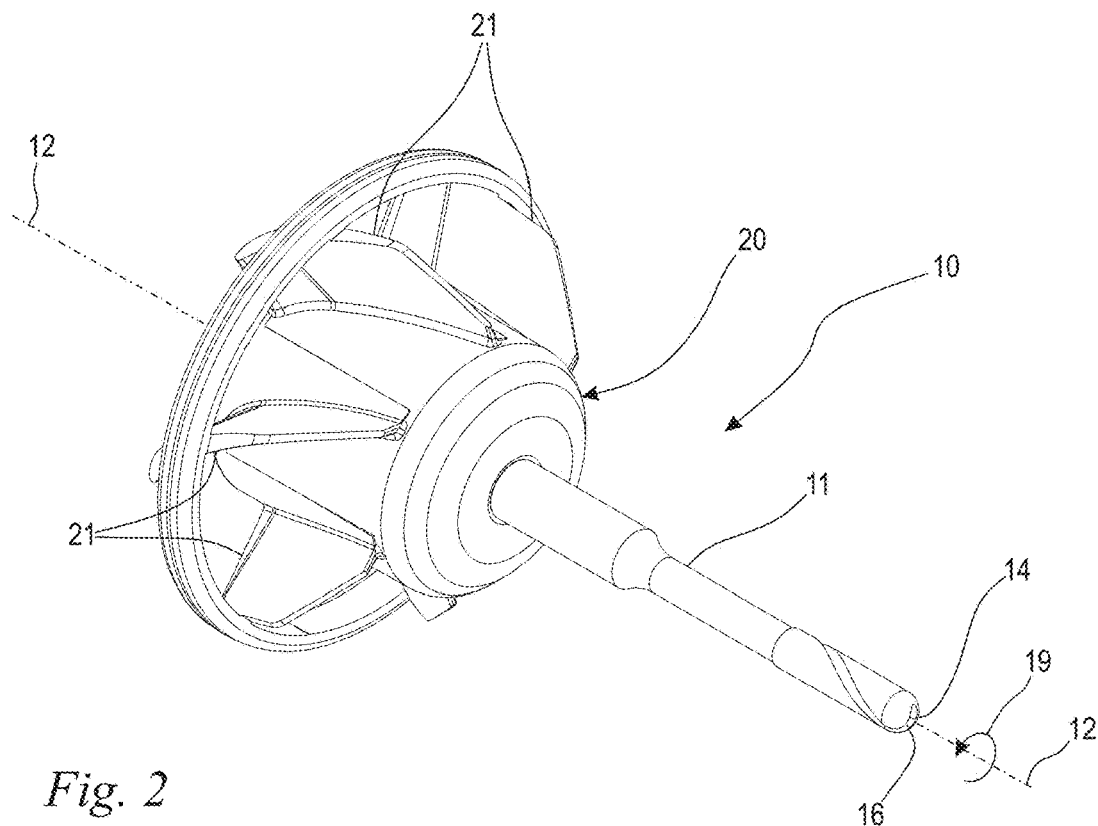
FIG. 2 is a perspective front view showing a milling tool with a blower wheel.
Figure 3:
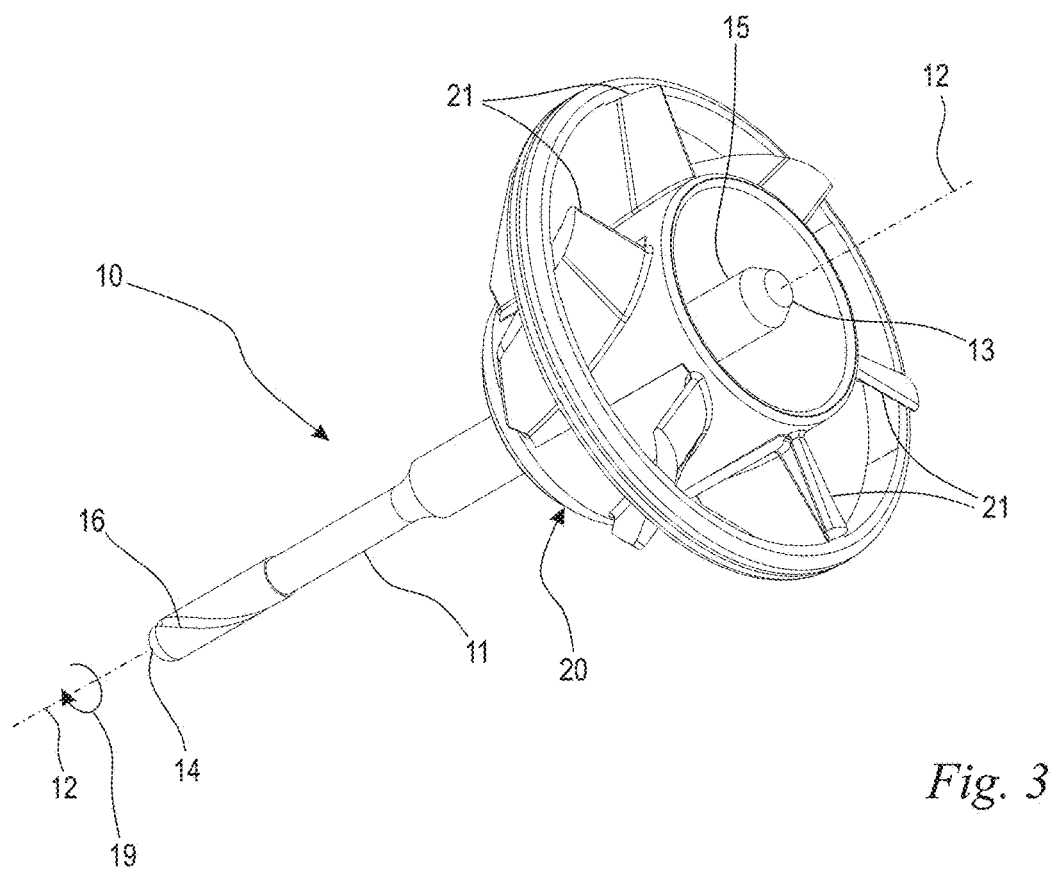
FIG. 3 is a perspective rear view showing a milling tool with a blower wheel.

FIGS. 2 and 3 illustrate the milling tool 10 according to the invention. The milling tool 10 has a base body 11 with a rotation axis 12. The rotation axis 12 of the base body 11 also corresponds to the longitudinal axis of the base body 11. The base body 11 extends along its rotation axis 12 from a first end 13 to a second end 14. A shank 15 is provided at the first end 13 of the base body 11. In particular, the shank 15 is formed on the base body 11. The shank 15 is used to clamp the milling tool 10 in a tool holder 7 (FIGS. 8 and 9) of the milling spindle 5. A cutting edge 16 is provided at the second end 14 of the base body 11. The cutting edge 16 is preferably formed on the base body 11. The cutting edge 16 of the base body 11 is used to remove chips from the workpiece.

Figure 6:
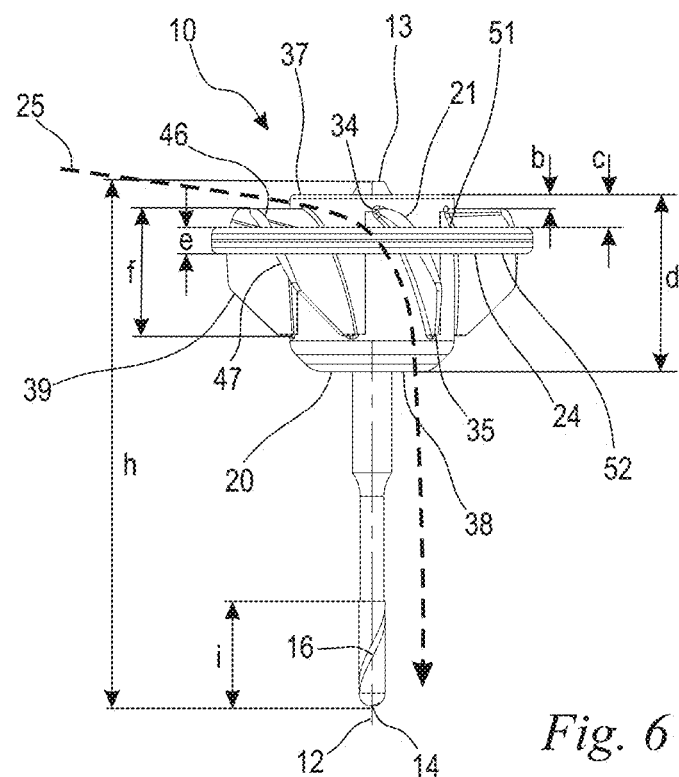
FIG. 6 is a side view showing the tool according to FIG. 2.

As illustrated in FIG. 6, in the embodiment, the cutting edge 16 starts at the second end 14 of the base body 11 and extends in the direction of the first end 13 along a cutting edge length i, where the cutting edge length i, measured in the direction of rotation axis 12, corresponds to at least 5%, preferably at least 10%, in particular about 20%, of the total length h of the base body 11. The total length h of the base body 11 corresponds to the distance h between the first end 13 and the second end 14 measured in the direction of rotation axis 12. In alternative embodiments, it may also be expedient to design the cutting edge 16 differently.

FIGS. 2 and 3 illustrate a direction of rotation 19 of the milling tool 10. In the intended operation provided for the milling tool 10, the milling tool 10 is driven in rotation about the rotation axis 12 in the direction of rotation 19. The intended operation is the operation of the milling tool 10, in which chip removal is performed by the cutting edge 16 on the workpiece. If the milling tool 10 is driven opposite to the direction of rotation 19, chip removal is not possible. In the present embodiment, the milling tool 10 is designed as a clockwise rotating tool. Of course, in an alternative embodiment, the milling tool 10 can also be designed as a counterclockwise tool.

As illustrated in FIGS. 2 and 3, the milling tool 10 includes a blower wheel 20. The blower wheel 20 is aligned coaxially with the base body 11 of the milling tool 10. The blower wheel 20 is mounted on a receiving section 17 (FIG. 5) of the base body 11. The receiving section 17 is arranged between the shank 15 and the cutting edge 16. In the preferred embodiment, the receiving section 17 is directly adjacent to the shank 15. The blower wheel 20 is co-rotatingly connected to the base body 11. In the preferred embodiment, the blower wheel 20 is attached to the base body 11 via compression. Accordingly, the blower wheel 20 is firmly connected to the base body 11 both rotationally and axially. In the preferred embodiment, the blower wheel 20 is formed from a plastic material. In an alternative embodiment, it may be expedient for the blower wheel 20 to be formed from a different material.

The base body 11 of the milling tool 10 is preferably made of a metal material. In the exemplary embodiment, the cutting edge 16 of the milling tool 10 is also made of a metal material, particularly a hard metal. In an alternative embodiment of the milling tool 10, the cutting edge 16 can also be formed from another high-strength material. In the preferred embodiment, the cutting edge 16 is formed directly on the base body 11. In an alternative embodiment, however, it may also be expedient to form the cutting edge 16 as a component separate from the base body 11, the component being mounted on the base body 11.

Figure 4:
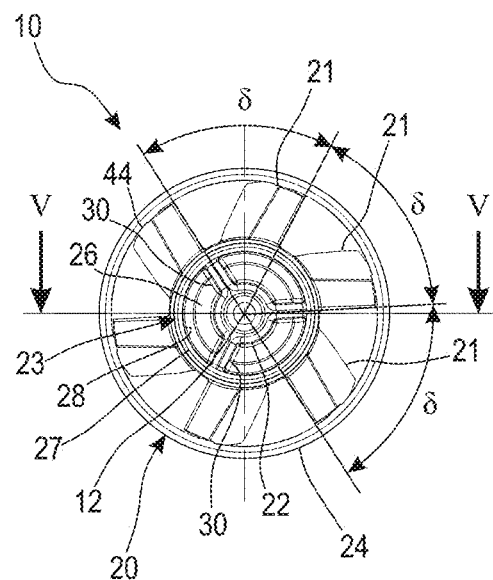
FIG. 4 is a top view of the milling tool according to FIG. 2 with ribs on the blower wheel.

As illustrated in FIGS. 2 and 3, the blower wheel 20 has multiple blades 21. Blades 21 that are adjacent to each other in the circumferential direction of the rotation axis 12 are arranged at uniform angular distances δ relative to the circumferential direction of the rotation axis 12 (FIG. 4). In the embodiment, the blower wheel 20 has six blades 21. Accordingly, the angular distance δ between two adjacent blades 21 is 60°. It may be useful in an alternative embodiment of the milling tool 10 to provide fewer or more blades 21.

Figure 5:
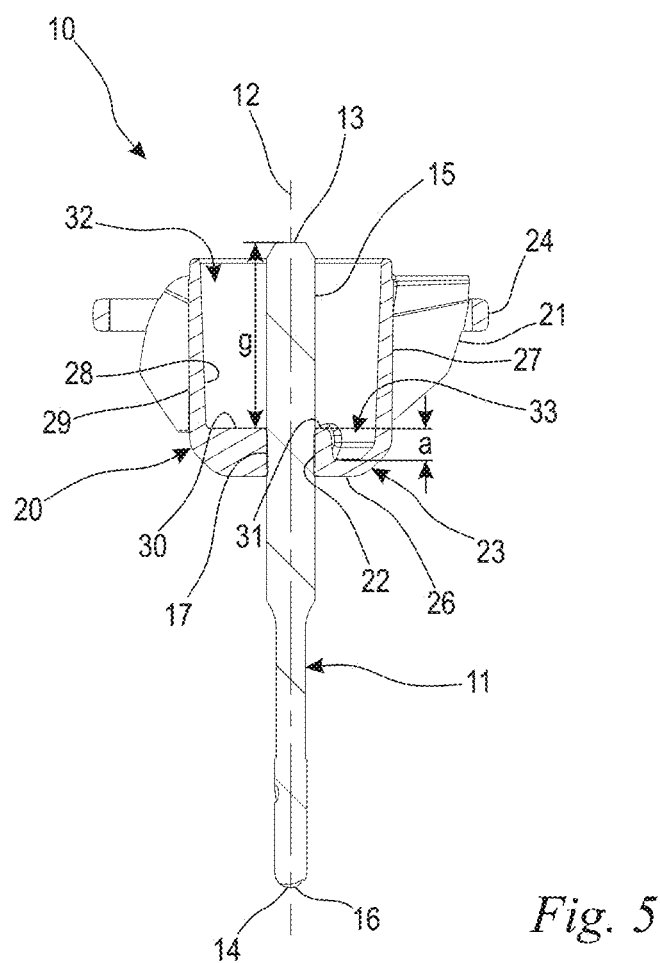
FIG. 5 is a lateral sectional view showing the milling tool along the intersection lines between the arrows V according to FIG. 4.

FIG. 5 illustrates a sectional view of the milling tool 10 along the line of intersection between the arrows V according to FIG. 4. As illustrated in FIG. 5, the blower wheel 20 includes a hub 22. The blower wheel 20 is held by the hub 22 in a rotationally fixed manner on the base body 11, particularly on the receiving section 17 of the base body 11. In the preferred embodiment, the hub 22 is pressed onto the base body 11. In an alternative embodiment, it may be expedient to choose another type of fastening instead of the press fit. Connected to the hub 22 of the blower wheel 20 is a retaining body 23. Blades 21 of the blower wheel 20 are arranged on the retaining body 23. The retaining body 23 has a base 26 and a circumferential wall 27. The base 26 extends radially outward from the hub 22 with respect to the rotation axis 12. The circumferential wall 27 is adjoined at the outer end of the base 26 with respect to the rotation axis 12. The circumferential wall 27 extends in a generally cylindrical shape in the direction from the second end 14 toward the first end 13. The base 26 of the retaining body 23 faces the second end 14 of the base body 11. In the direction of the first end 13 of the base body 11, the retaining body 23 is open. The retaining body 23 is pot shaped.

In the preferred embodiment, the hub 22 and the retaining body 23 are formed in one piece. It can also be provided that the hub 22 and the retaining body 23 are made of several parts. The blades 21 are provided on the circumferential wall 27, particularly on the outer side 29 of the circumferential wall 27. The circumferential wall 27 includes an inner side 28 and the outer side 29. The inner side 28 of the circumferential wall 27 faces the rotation axis 12 of the base body 11. The outer side 29 of the circumferential wall 27 faces away from the rotation axis 12 of the base body 11.

As illustrated in FIGS. 4 and 5, a plurality of ribs 30, particularly three ribs 30, are provided in the blower wheel 20. The ribs 30 extend radially outward from the hub 22 of the blower wheel 20 with respect to the rotation axis 12 to the inner side 28 of the circumferential wall 27. The ribs 30 are distributed relative to each other in the circumferential direction of the rotation axis 12 in such a way that adjacent ribs 30 have uniform angular spacing in the circumferential direction of the rotation axis 12. The ribs 30 are also connected to the base 26 of the retaining body 23.

As illustrated in FIG. 5, a stop 31 is formed at the end of the hub 22 facing the shank 15 of the base body 11. When clamping the milling tool 10 in a tool holder 7 of the milling spindle 5, the stop 31 limits the clamping depth g of the milling tool 10 measured in the direction of the rotation axis 12. The blower wheel 20 includes an antechamber 33 and an interior space 32. The antechamber 33 is bounded by the hub 22, the base 26 of the retaining body 23, and at least partially by the inner side 28 of the circumferential wall 27. Immediately adjacent to the antechamber 33 is the interior space 32, which is bounded only by the inner side 28 of the circumferential wall 27 and by the shank 15 of the base body 11. The antechamber 33 is used to collect chips or other debris from the blower wheel so that they cannot become lodged on the stop 31 of the hub 22. This ensures that when the milling tool 10 is clamped between the tool holder 7 of the milling spindle 5 and the stop 31 of the hub 22, no particles such as dust or chips are clamped in which would impair the function of the milling tool 10.

As illustrated in FIGS. 4 and 5, the blower wheel includes an outer ring 24. The outer ring 24 encompasses the blades 21 in the circumferential direction of the rotation axis 12. The outer ring 24 is arranged on the outer side 44 of the blades 21, which is formed radially with respect to the rotation axis 12. The outer sides 44 of the blades 21 form the radially outer end of the blades 21 in relation to the rotation axis 12. The outer ring 24 connects the blades 21 to each other at their outer sides 44. The outer ring 24 stiffens the arrangement of the blades 21 to each other. By stiffening the blades 21, the blower wheel 20 is dimensionally stable even at high speeds.

In the preferred embodiment, the blower wheel 20, consisting of the hub 22, the retaining body 23, the blades 21, and the outer ring 24, is made of one piece. Preferably, the blower wheel 20 is an injection molded part. In an alternative embodiment of the blower wheel 20, it can also be formed as multiple parts.

As illustrated in FIG. 6, the blower wheel 20 has a first end face 37 facing the first end 13 of the base body 11 and a second end face 38 facing the second end 14 of the base body 11. The first end face 37 forms the top end of the blower wheel 20; the second end face 38 forms the bottom end of the blower wheel 20. Accordingly, the blower wheel 20 extends over a length d corresponding to the distance between the first end face 37 of the blower wheel 20 and the second end face 38 of the blower wheel 20. The outer ring 24 is arranged on the blades 21 in such a way that a distance c measured in the direction of the rotation axis 12 is provided between the outer ring 24 and the first end face 37. The distance c between the outer ring 24, particularly a top side 51 of the outer ring 24 facing the first end 13 of the base body 11, and the first end face 37 of the blower wheel 20 ensures that an air gap 43 is formed between the outer ring 24 and the milling spindle 5 even when the milling tool 10 is clamped in the milling spindle 5. Accordingly, the distance c forms the minimum height of the air gap 43. The air gap 43 allows sufficient air supply even if a spindle nose 6 of spindle 48 would extend to the end face 37 of the blower wheel 20 and radially to the rotation axis 12 up to the outer ring 24. If the spindle 48 projects radially to the rotation axis 12 beyond the blades 21, particularly the outer ring 24, axial air supply to the blower wheel 20 is no longer possible. The air gap 43 ensures that the blower wheel 20 can draw in sufficient air radially to the rotation axis. Accordingly, the air above the outer ring 24 flows radially toward the blades 21 of the blower wheel 20. The blades 21 divert the radially sucked air in an axial direction parallel to the rotation axis 12. The air flows out of the blower wheel 20 in the direction of the second end 14 of the base body 11. This results in an air flow 25 that is sucked in radially to the rotation axis 12 and flows through the blower wheel 20 in the direction of the second end 14 of the base body 11.

To suck in an air flow 25 directed radially to the rotation axis 12, the blades 21 project beyond the outer ring 24 in the direction of the rotation axis 12 toward the shank 15. Accordingly, the distance c between the top side 51 of the outer ring 24 and the first end face 37 of the blower wheel 20 is greater than the distance b between a top profile side 46 of the blades 21 and the first end face 37 of the blower wheel 20 measured in the direction of the rotation axis 12. The blades 21 each have the profile top side 46 facing the first end 13 of the base body 11 and a profile bottom side 47 facing the second end 14 of the base body 11.

During operation of the milling tool 10, the air flow 25 is directed over the blower wheel 20 in the direction of the second end 14 of the base body 11. Due to the rotation of the blower wheel 20, centrifugal forces also act on the air flow 25. The outer ring 24 also operates as an air guide element, preventing air from flowing away radially outward, at least partially. Thus, the air flow 25 is guided through the outer ring 24 in the direction of the second end 14 of the base body 11.

Another effect of the outer ring 24 is that it prevents an overflow at the outer sides 44 of the blades 21 from the profile bottom side 47 to the profile top side 46. Thus, a higher pressure potential can be generated between the profile top side 46 and the profile bottom side 47, which in turn can result in increased effectiveness of the blower wheel 20.

Figure 7:
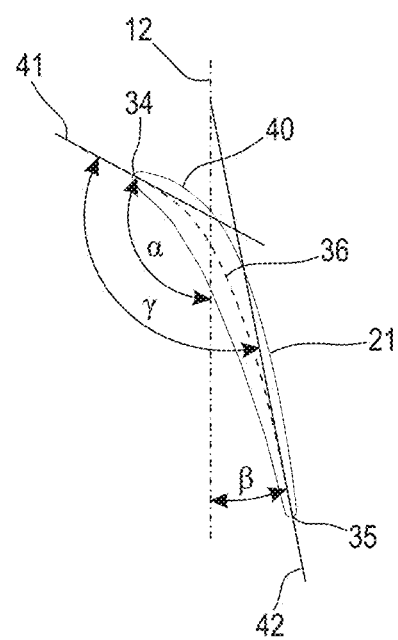
FIG. 7 shows the profile of a blade of a blower wheel of the tool according to FIG. 2.

FIG. 7 illustrates a profile 40 of a blade 21. The profile 40 extends from a leading edge 34 along a profile center line 36 to a trailing edge 35. In a view radial to the rotation axis 12, the tangent 41 adjacent to the profile center line 36 at the leading edge 34 forms an inlet angle α with the rotation axis 12. The inlet angle α is within a range of 90° to 130°, particularly within a range of 100° to 120°. A second tangent 42 adjacent to the profile center line 36 at the trailing edge 35 forms an outlet angle β with the rotation axis 12 in the direction of view radial to the rotation axis 12. The outlet angle β is between 0° and 20°, particularly between 5° and 15°. The sum of inlet angle α and outlet angle β forms the camber angle γ. The camber angle γ is generally known as the setting angle of a profile 40. The camber angle γ is greater than the inlet angle α and greater than the outlet angle β. This specific angular position diverts the flow from an almost horizontal inflow of the profile 40 into an outflow at the trailing edge 35 that is almost parallel to the rotation axis 12. This allows a targeted air flow to be directed in the direction of the rotation axis 12 onto the workpiece or onto the parts of the dental milling machine 1 that are to be cleaned. The blades 21 of the present blower wheel 20 are oriented in such a way that the blower wheel 20 forms an airflow extending from the leading edge 34 to the trailing edge 35 only for a clockwise rotating milling tool 10. For a counterclockwise rotating tool, both the cutting edge 16 as well as the orientation of blades 21 must be adjusted.

As illustrated in FIG. 6, the blades 21 have a blade length f, where the blade length f corresponds to the distance between the leading edge 34 and the trailing edge 35 measured in the direction of rotation axis 12. The outer ring has a thickness e corresponding to the distance between the top side 51 and a bottom side 52 of the outer ring 24 measured in the direction of the rotation axis 12. The top side 51 of the outer ring 24 faces the second end 14 of the base body 11. The blade length f is less than the length d of the blower wheel 20. The blade length f is at least 50%, preferably at least 70% of the length d of the blower wheel 20. The thickness e of the outer ring 24 corresponds to at least 10%, particularly at least 15% of the blade length f. The thickness e of the outer ring 24 corresponds to at most 50%, particularly at most 30% of the blade length f. The length d of the blower wheel 20 is within a range of 10% to 40%, particularly in a range of 20% to 35% of the total length h of the milling tool 10.

As illustrated in FIG. 6, the blower wheel 20 has a conical outer contour 39 when viewed radially to the rotation axis 12. The conical outer contour 39 is created by a chamfer of the blades 21 and a chamfer of a lower portion of the retaining body 23. The conical outer contour 39 reduces the risk of collision when the milling tool 10 swivels with the workpiece.

FIG. 8 illustrates a milling spindle 5 of a dental milling machine 1. The milling spindle 5 includes the spindle 48 driven by the electric motor 49, where the spindle 48 has a spindle nose 6 at its lower end. As illustrated in FIG. 8, the blower wheel 20 encompasses the spindle nose 6. The blower wheel 20 is formed in such a way that the spindle nose 6 is at least partially located in the interior 32 of the retaining body 23 of the blower wheel 20. Accordingly, the inner diameter j of the retaining body 23 is larger than the outer diameter k of the spindle nose 6. The inner diameter j of the retaining body 23 refers to the inner side 28 of the retaining body 23. The retaining body 23 and the spindle nose 6 are arranged relative to each other in such a way that they have a sealing gap 50. The width of the sealing gap corresponds to at most 10%, preferably at most 5% of the outer diameter k of the spindle nose 6. This protects the spindle nose 6 from contamination, such as chips or dust.

In the preferred embodiment, the retaining body extends approximately over the length of the shank 15, i.e., approximately over the clamping depth g. The pot-shaped design of the retaining body 23 allows the spindle nose 6 to overlap, so that when the milling tool is clamped over the entire clamping depth g, the spindle nose 6 can be guided into the pot-shaped retaining body 23 without touching it. Thus, despite the blower wheel 20, the milling tool 10 has a compact design in the direction of the rotation axis 12.

The use of the milling tool 10 with the blower wheel 20 is particularly advantageous during milling operations that generate a particularly large amount of chips and/or dust, such as when roughing the workpiece. Naturally, the milling tool 10 with the blower wheel 20 can only be used for cleaning the workpiece and/or the dental milling machine 1. Contact with the workpiece or chip removal is not required. Thus, after corresponding production processes, the milling tool 10 according to the invention can be received in the tool holder 7, and contamination of the workpiece and/or the dental milling machine 1 can be blown out. The blown-out chips and/or dust can be extracted from the dental milling machine by an extraction system not shown in greater detail. The control device 4 of the dental milling machine 1 can be used to set specific travel paths of the milling spindle 5 in order to optimize cleaning by the air flow 25 generated by the blower wheel 20.

Figure 10:
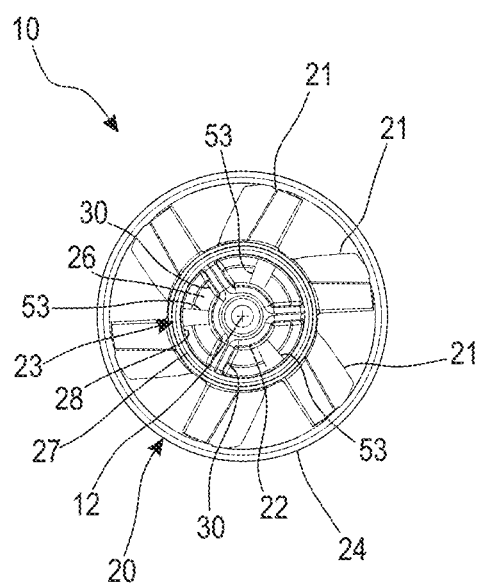
FIG. 10 is a top view showing an alternative design of a milling tool with outlet openings.

FIG. 10 illustrates an alternative design of the milling tool 10. This alternative embodiment differs from the milling tool 10 according to FIGS. 2 to 9 only in the formation of three outlet openings 53 on the retaining body 23. The outlet openings 53 are provided at the retaining body 23 and are used for draining fluid from the retaining body 23. In particular, the outlet openings 53 are provided at the base 26 of the retaining body 23. By forming three ribs 30, the retaining body 23 also has a subdivision of three antechambers 33, wherein an outlet opening 53 is provided for draining fluid for each of the three antechambers 33 in the preferred embodiment. Thus, an accumulation of fluids in antechambers 33 can be avoided. Of course, it may also be expedient to provide a different number of outlet openings 53. The outlet openings 53 are preferably distributed around the rotation axis 12 at uniform angular intervals, thus preventing the milling tool 10 from being imbalanced.

What is claimed is:

1. A milling tool (10) for a dental milling machine, the milling tool (10) comprising:
    a one-piece base body (11) extending along a rotation axis (12) from a first end (13) to a second end (14), the base body (11) including a shank (15) for clamping the base body (11) at the first end (13), a cutting edge (16) formed on the base body (11) at the second end (14), and a receiving section (17) between the shank (15) and the cutting edge (16); and
    a blower wheel (20) arranged on the receiving section (17) of the base body (11), the blower wheel (20) being designed such that, when the milling tool (10) is driven in a direction of rotation (19) provided for chip removal, an air flow (25) is generated by the blower wheel (20) in a direction from the blower wheel (20) toward the cutting edge (16) of the milling tool (10),
    wherein the blower wheel (20) comprises a hub (22) and a pot-shaped retaining body (23) adjacent to the hub (22),
    wherein the hub (22) is press-fitted on the receiving section (17), and
    wherein blades (21) of the blower wheel (20) are attached to an outer surface of a circumferential wall (27) of the pot-shaped retaining body (23).

2. The milling tool according to claim 1,
    wherein adjacent ones of the blades (21) of the blower wheel (20) are arranged at a uniform angular distance around the rotation axis (12) of the base body (11).

3. The milling tool according to claim 2,
    wherein the blower wheel (20) comprises an outer ring (24), and
    wherein the outer ring (24) encompasses the blades (21) of the blower wheel (20).

4. The milling tool according to claim 3,
    wherein the blower wheel (20) comprises a first end face (37) disposed opposite the cutting edge (16) of the base body (11),
    wherein a distance (b) between the blades (21) and the first end face (37) of the blower wheel (20) measured in the direction of the rotation axis (12) is less than a distance (c) between the outer ring (24) and the first end face (37) of the blower wheel (20) measured in the direction of the rotation axis (12).

5. The milling tool according to claim 2,
    wherein each of the blades (21) extends along a respective profile center line (36) from a respective leading edge (34) to a respective trailing edge (35).

6. The milling tool according to claim 5,
    wherein a respective first tangent (41) at the respective profile center line (36) in the respective leading edge (34) of each of the blades (21) encloses a respective inlet angle ($\alpha$) with the rotation axis (12) of the base body (11), and
    wherein each of the inlet angles ($\alpha$) is within a range of 90° to 130°.

7. The milling tool according to claim 6,
    wherein each of the inlet angles ($\alpha$) is within a range of 100° to 120°.

8. The milling tool according to claim 5,
    wherein a respective second tangent (42) at the respective profile center line (36) in the respective trailing edge

(35) of each of the blades (21) forms a respective outlet angle (β) with the rotation axis (12) of the base body (11), and wherein each of the outlet angles (β) is within a range from 0° to 20°.

9. The milling tool according to claim 8, wherein the outlet angle (β) is within a range from to 5° to 15°.

10. The milling tool according to claim 1, further comprising a stop (31) disposed on a side of the hub (22) proximal to the shank (15), wherein the stop (31) is configured to limit a clamping depth (g) when clamping the milling tool (10) in a tool holder (7) of a milling spindle (5).

11. The milling tool according to claim 1, wherein the blower wheel (20) comprises an antechamber (33), wherein the antechamber (33) is bounded by the hub (22), by a base (26) of the retaining body (23), and by a circumferential wall (27) of the retaining body (23).

12. The milling tool according to claim 11, wherein the antechamber (33) is subdivided by multiple ribs (30) extending radially to the rotation axis (12) for stiffening the retaining body (23).

13. The milling tool according to claim 1, wherein the circumferential wall (27) of the retaining body (23) is designed to at least partially circumferentially encompass a milling spindle (5) when the milling tool (10) is clamped.

14. The milling tool according to claim 1, wherein the blower wheel (20) has a conical outer contour (39) in a view radial to the rotation axis (12) of the base body (11).

15. An assembly comprising:

a milling spindle; and the milling tool according to claim 1, wherein the milling tool (10) is held in a tool holder (7) of the milling spindle (5), wherein a first end (8) of the milling spindle (5) disposed toward the milling tool (10) is formed from a spindle nose (6), and wherein the blower wheel (20) of the milling tool (10) at least partially circumferentially encompasses the spindle nose (6).

\* \* \* \* \*